(12) United States Patent
Klopffleisch

(10) Patent No.: US 12,553,569 B2
(45) Date of Patent: Feb. 17, 2026

(54) MOUNTING SYSTEM FOR EQUIPMENT

(71) Applicant: Progress Rail Locomotive Inc., LaGrange, IL (US)

(72) Inventor: Frederico Mateus Klopffleisch, Cuntiba-PR (BR)

(73) Assignee: Progress Rail Locomotive Inc., LaGrange, IL (US)

( * ) Notice: Subject to any disclaimer, the term of this patent is extended or adjusted under 35 U.S.C. 154(b) by 59 days.

(21) Appl. No.: 18/751,757

(22) Filed: Jun. 24, 2024

(65) Prior Publication Data
US 2025/0389380 A1    Dec. 25, 2025

(51) Int. Cl.
*F16M 13/00* (2006.01)
*F16B 13/08* (2006.01)
*F16M 13/02* (2006.01)

(52) U.S. Cl.
CPC ........... *F16M 13/022* (2013.01); *F16B 13/08* (2013.01)

(58) Field of Classification Search
CPC ............................. F16M 13/022; F16B 13/08
See application file for complete search history.

(56) References Cited

U.S. PATENT DOCUMENTS

| | | | |
|---|---|---|---|
| 7,140,703 B1 | 11/2006 | Holdgate, III et al. | |
| 9,500,219 B2* | 11/2016 | Aoshima | F16B 37/0857 |
| 10,959,520 B2 | 3/2021 | Filipowicz | |
| 11,066,004 B2 | 7/2021 | Schroeder et al. | |
| 11,391,509 B2 | 7/2022 | Zhu et al. | |
| 11,808,404 B1* | 11/2023 | Sirlin | F16B 2/185 |
| 12,372,193 B2* | 7/2025 | Degner | F16M 11/10 |

FOREIGN PATENT DOCUMENTS

WO    2022125398    6/2022

* cited by examiner

*Primary Examiner* — Amy J. Sterling

(57) ABSTRACT

A mounting system, adapted to removably couple the equipment with a mounting structure, includes a mounting bracket coupled to the mounting structure, a first flexible member disposed axially adjacent to the mounting bracket, and a pin disposed axially adjacent to the first flexible member. The first flexible member is disposed between the mounting bracket and the pin. The pin includes a base and a body extending from the base. The body includes a uniform section and a tapering section. The mounting system includes a second flexible member disposed axially adjacent to the mounting bracket and a cover disposed axially adjacent to the second flexible member. The second flexible member is disposed between the cover and the pin. The mounting system further includes at least two mechanical fasteners that removably couple the mounting bracket with each of the first flexible member, the pin, the second flexible member, and the cover.

20 Claims, 4 Drawing Sheets

MOUNTING SYSTEM FOR EQUIPMENT

TECHNICAL FIELD

The present disclosure relates to a mounting system for an equipment and a mounting assembly for the equipment.

BACKGROUND

Equipment, for example, electric equipment or electronic equipment that are used in high vibration environments need to be adequately secured so that no relative movement occurs between the equipment and a mounting structure. Any relative movement between the equipment and the mounting structure may cause wear, fatigue, and ultimately premature failures of the equipment or the supporting structure, which may incur additional costs for replacement and/or servicing. Typically, bolts are used to couple the equipment to the mounting structure. However, in some applications, due to a design or a position of the equipment and/or the mounting structure, it may not be possible to access all sides of the equipment to fasten the bolts. For example, if the equipment is coupled with the mounting structure using a drawer-like arrangement, it may be difficult to couple the equipment with the mounting structure using bolts. Thus, a solution is needed to ensure adequate mounting of the equipment with the mounting structure.

U.S. Pat. No. 7,140,703 describes a drawer assembly whereby an angular and horizontally configured guide slot is embedded on the guide brackets that produces a travel pattern. The drawer side panels have forward and rear cylindrical protrusions that engage the guide slot. The travel pattern is designed to control the drawer's position within the assembly and the forward and rearward range of movement. A decorator front panel provides a space for a handle and limits the rearward movement of the drawer. Removable stay pins in the guide slot stop the drawer from being unintentionally disengaged. A bottom stiffener at the rear of the assembly adds rigidity and also can support under counter lighting or other items.

SUMMARY OF THE DISCLOSURE

In an aspect of the present disclosure, a mounting system for an equipment is provided. The mounting system is adapted to removably couple the equipment with a mounting structure. The mounting system includes a mounting bracket coupled to the mounting structure. The mounting system also includes a first flexible member disposed axially adjacent to the mounting bracket. The mounting system further includes a pin disposed axially adjacent to the first flexible member. The first flexible member is disposed between the mounting bracket and the pin. The pin includes a base and a body extending from the base along a first direction. The body includes a uniform section and a tapering section. The mounting system includes a second flexible member disposed axially adjacent to the mounting bracket. The mounting system also includes a cover disposed axially adjacent to the second flexible member. The second flexible member is disposed between the cover and the pin. The mounting system further includes at least two mechanical fasteners that removably couple the mounting bracket with each of the first flexible member, the pin, the second flexible member, and the cover. The at least two mechanical fasteners extend along a second direction that is opposite to the first direction.

In another aspect of the present disclosure, a mounting assembly for an equipment is provided. The mounting assembly includes a mounting structure adapted to be removably coupled with the equipment. The mounting assembly also includes a mounting system adapted to removably couple the equipment with the mounting structure. The mounting system includes a mounting bracket coupled to the mounting structure. The mounting system also includes a first flexible member disposed axially adjacent to the mounting bracket. The mounting system further includes a pin disposed axially adjacent to the first flexible member. The first flexible member is disposed between the mounting bracket and the pin. The pin includes a base and a body extending from the base along a first direction. The body includes a uniform section and a tapering section. The mounting system includes a second flexible member disposed axially adjacent to the mounting bracket. The mounting system also includes a cover disposed axially adjacent to the second flexible member. The second flexible member is disposed between the cover and the pin. The mounting system further includes at least two mechanical fasteners that removably couple the mounting bracket with each of the first flexible member, the pin, the second flexible member, and the cover. The at least two mechanical fasteners extend along a second direction that is opposite to the first direction.

Other features and aspects of this disclosure will be apparent from the following description and the accompanying drawings.

DETAILED DESCRIPTION

Wherever possible, the same reference numbers will be used throughout the drawings to refer to same or like parts.

Figure 1:
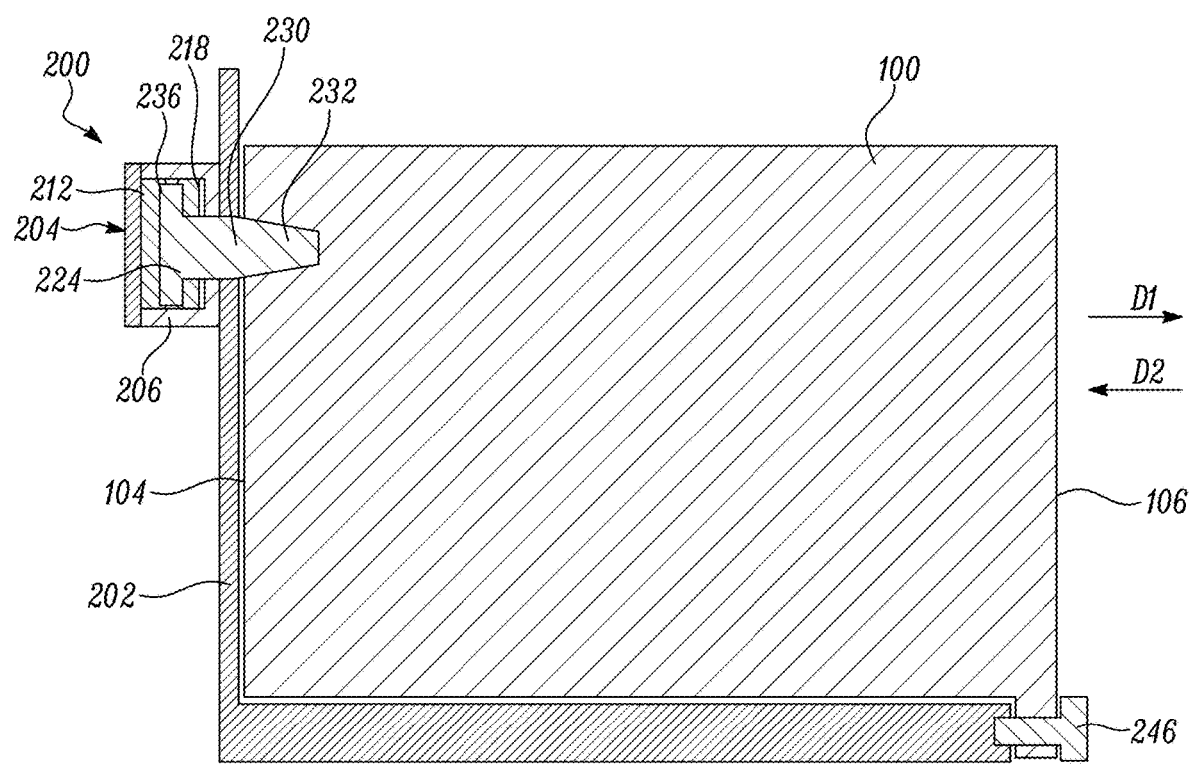
FIG. 1 is a cross-sectional side view of a mounting assembly, according to an example of the present disclosure.

Referring to FIG. 1, a mounting assembly 200 for an equipment 100 is illustrated. The mounting assembly 200 includes a mounting structure 202 that is removably coupled with the equipment 100. The equipment 100 may be an electric device or an electronic device. For example, the equipment 100 may be an inverter. Alternatively, the equipment 100 may be a converter. It should be noted that the present disclosure is not limited to a type of the equipment 100 and the mounting assembly 200 may be used to couple or mount any equipment with different types of mounting structures, without any limitations. In an example, the equipment 100 may be usable in a locomotive, such as, an electric locomotive, without any limitations.

Further, the mounting structure 202 may embody an enclosure having two sides or three sides, for example. In some examples, the equipment 100 and the mounting structure 202 may have a drawer-like arrangement, in which the equipment 100 may be slid into the mounting structure 202 for coupling with the mounting structure 202. Further, the equipment 100 defines an opening 102 having a tapering cross-section. The opening 102 extends along a first direction D1 and tapers from any one outer surface 104 of the equipment 100 towards an opposing outer surface 106 of the equipment 100.

The mounting assembly 200 also includes a mounting system 204 for the equipment 100. The mounting system 204 removably couples the equipment 100 with the mounting structure 202. The mounting system 204 includes a mounting bracket 206 coupled to the mounting structure 202. The mounting bracket 206 is fixedly coupled to or integral with the mounting structure 202. In an example, the mounting bracket 206 may be fixedly coupled to the mounting structure 202 by welding, soldering, brazing, and the like. In another example, the mounting bracket 206 may be removably coupled to the mounting structure 202 by using one or more fastening elements, such as, bolts, pin 224s, screws, and the like. In yet another example, the mounting bracket 206 may be integral with the mounting structure 202, in other words, the mounting bracket 206 and the mounting structure 202 may be formed as a single component.

Figure 2:
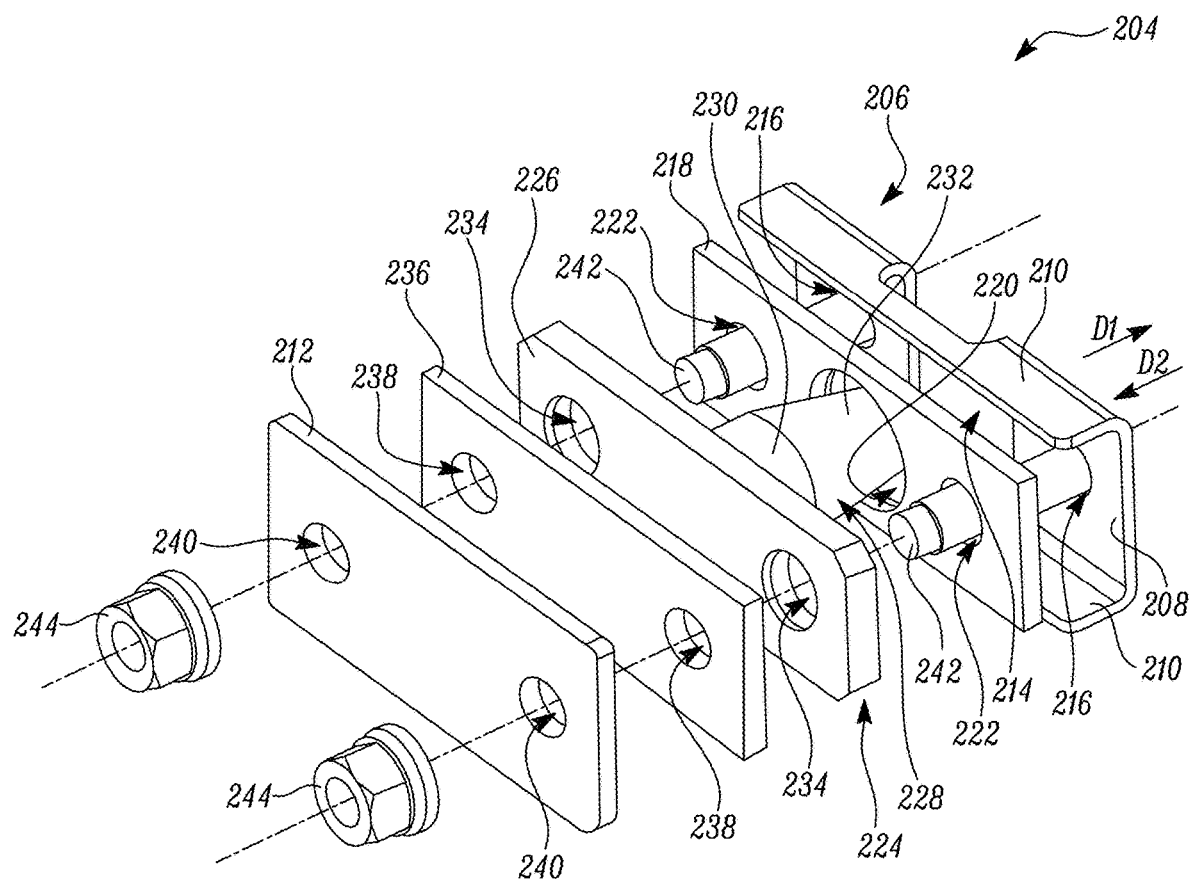
FIG. 2 is a cross-sectional side view of a mounting system of the mounting assembly of FIG. 1, according to an example of the present disclosure.

As shown in FIG. 2, the mounting bracket 206 includes a base plate 208 and a pair of side plates 210 extending along a second direction D2 from the base plate 208 to a cover 212. The second direction D2 is opposite to the first direction D1. The base plate 208 of the mounting bracket 206 defines a first central through-opening 214. The first central through-opening 214 is a rectangular opening herein. Alternatively, the first central through-opening 214 may have a square shape, a circular shape, and the like. The base plate 208 also defines a pair of first through-holes 216. In an example, the mounting bracket 206 may be made of steel.

The mounting system 204 also includes a first flexible member 218 disposed axially adjacent to the mounting bracket 206. The first flexible member 218 defines a second central through-opening 220. The second central through-opening 220 has a circular shape herein. The first flexible member 218 also defines a pair of second through-holes 222.

Figure 3:
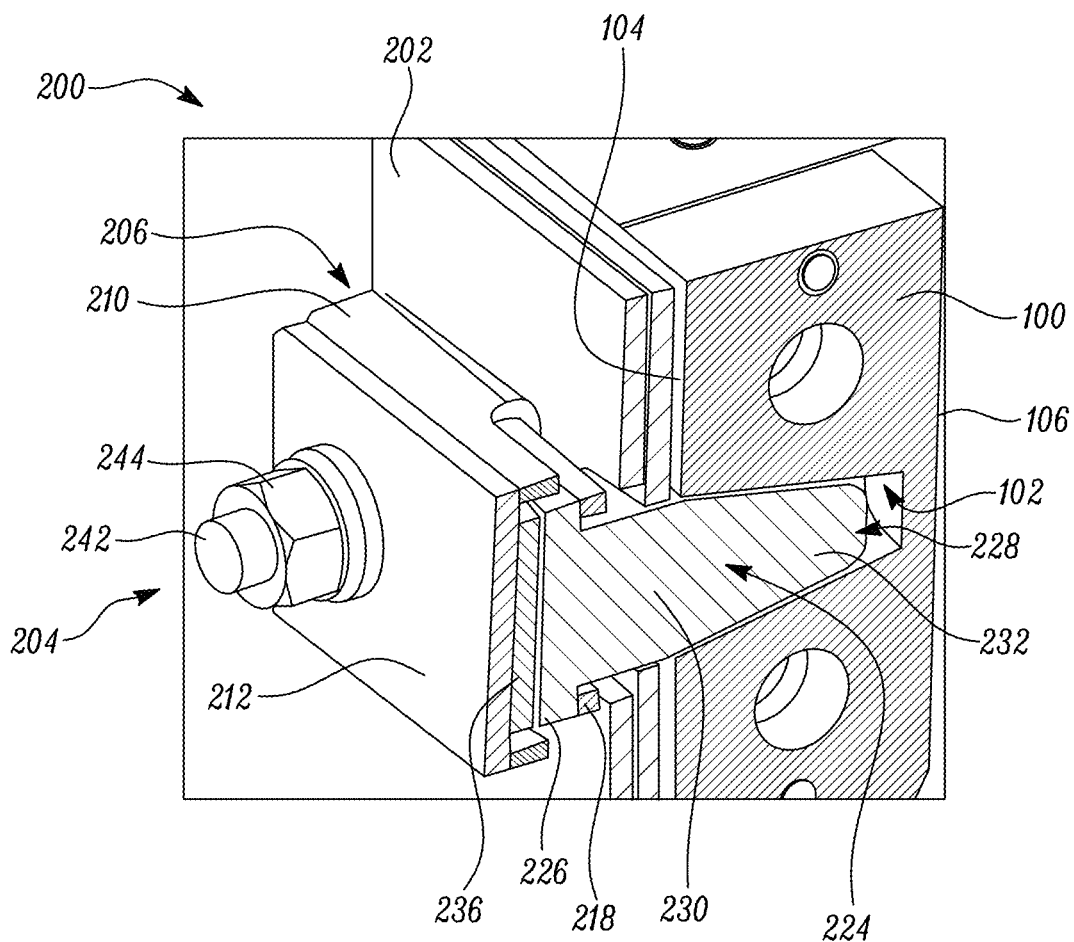
FIG. 3 is an exploded view of the mounting system of FIG. 2.

Referring now to FIGS. 2 and 3, the mounting system 204 further includes a pin 224 disposed axially adjacent to the first flexible member 218. The first flexible member 218 is disposed between the mounting bracket 206 and the pin 224. The pin 224 includes a base 226 and a body 228 extending from the base 226 along the first direction D1. The body 228 includes a uniform section 230 and a tapering section 232. The uniform section 230 is disposed adjacent to the base 226, such that the uniform section 230 extends between the base 226 and the tapering section 232. Further, in an assembled state of the mounting system 204, the tapering section 232 is received within the opening 102 of the equipment 100 to couple the pin 224 with the equipment 100. Furthermore, each of the first central through-opening 214 of the mounting bracket 206 and the second central through-opening 220 of the first flexible member 218 receive the uniform section 230 of the body 228 of the pin 224. The base 226 defines a pair of third through-holes 234. The pin 224 may be made of aluminum or steel.

The mounting system 204 includes a second flexible member 236 disposed axially adjacent to the mounting bracket 206. Each of the first flexible member 218 and the first flexible member 218 is made of a rubber. Alternatively, the first flexible member 218 and the first flexible member 218 may be made of any other compressible material. Further, the second flexible member 236 defines a pair of fourth through-holes 238.

The mounting system 204 also includes the cover 212 disposed axially adjacent to the second flexible member 236. The second flexible member 236 is disposed between the cover 212 and the pin 224. Further, the cover 212 defines a pair of fifth through-holes 240. In an example, the cover 212 may be made of steel.

It should be noted that dimensions of each of the base plate 208 of the mounting structure 202, the first flexible member 218, the base 226 of the pin 224, the second flexible member 236, and the cover 212 may have the same length and width. However, a thickness of each of the base plate 208 of the mounting structure 202, the first flexible member 218, the base 226 of the pin 224, the second flexible member 236, and the cover 212 that is defined along the first direction D1 may vary, as per application requirements.

Referring now to FIG. 2, the mounting system 204 further includes two or more mechanical fasteners 242 that removably couple the mounting bracket 206 with each of the first flexible member 218, the pin 224, the second flexible member 236, and the cover 212. In the illustrated example of FIG. 2, the mounting system 204 includes two mechanical fasteners 242. However, a number of the mechanical fasteners 242 may vary based on dimensions of the mounting assembly 200 or the equipment 100. The two or more mechanical fasteners 242 extend along the second direction D2 that is opposite to the first direction D1. The mounting bracket 206 is fixedly coupled to or integral with the two or more mechanical fasteners 242. In an example, the mechanical fasteners 242 may be fixedly coupled to the mounting bracket 206 by welding, soldering, brazing, and the like. In another example, the mechanical fasteners 242 may be integral with the mounting bracket 206, in other words, the mechanical fasteners 242 and the mounting bracket 206 may be formed as a single component.

The two or more mechanical fasteners 242 pass through each of the base plate 208 of the mounting bracket 206, the first flexible member 218, the base 226 of the pin 224, the second flexible member 236, and the cover 212. Specifically, the mechanical fasteners 242 are received within each of the first, second, third, fourth, and fifth through-holes 216, 222, 234, 238, 240 to allow coupling of the mounting bracket 206, the first flexible member 218, the pin 224, the second flexible member 236, and the cover 212 with each other.

The mounting system 204 further includes two or more retention nuts 244. The two or more mechanical fasteners 242 are removably coupled to a corresponding retention nut 244 to retain the two or more mechanical fasteners 242 in coupling with each of the mounting bracket 206, the first flexible member 218, the pin 224, the second flexible member 236, and the cover 212. The two or more retention nuts 244 are disposed adjacent to the cover 212. In the illustrated example of FIG. 2, the mounting system 204 includes two retention nuts 244. However, a number of the retention nuts 244 may vary based on the number of mechanical fasteners 242. In some cases, the mounting assembly 200 may include an additional fastener 246 (shown in FIG. 1) to couple the equipment 100 with the mounting structure 202. The fastener 246 may be a bolt, for example.

Figures 4A, 4B:
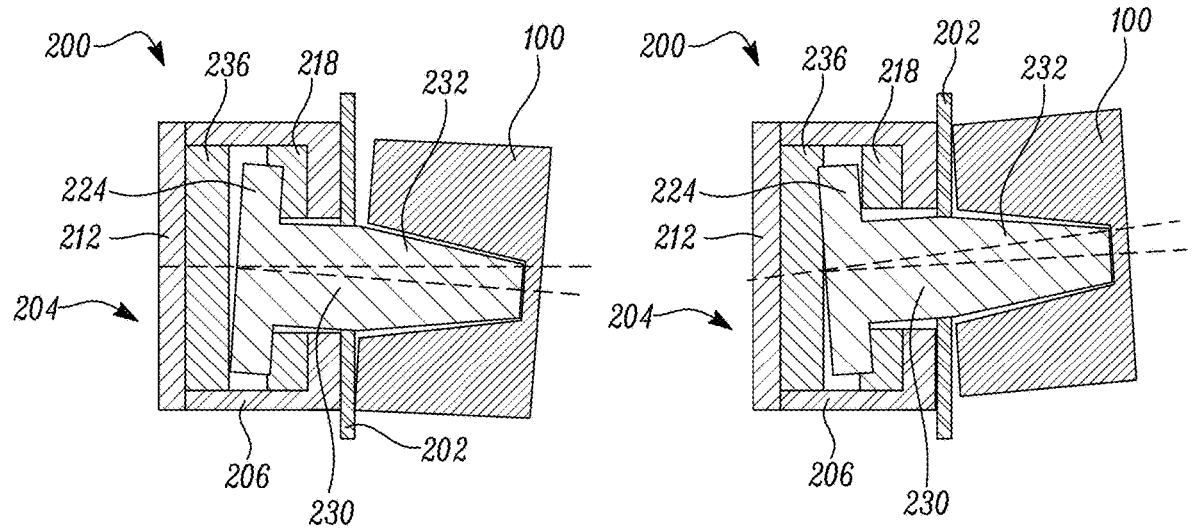
FIGS. 4A and 4B illustrate angular movement of an equipment coupled to the mounting system.

As shown in FIGS. 4A and 4B, the mounting system 204 allows a small amount of angular movement of the equipment 100 in different degrees of freedom. Moreover, the mounting system 204 may also allow a small amount of linear movement of the equipment 100 in different degrees of freedom. The angular as well as linear movement is particularly possible because of the first and second flexible members 218, 236. In other words, as the first and second flexible members 218, 236 are made of compressible material, the mounting system 204 may allow the angular movement and linear movement of the equipment 100.

It is to be understood that individual features shown or described for one embodiment may be combined with individual features shown or described for another embodiment. The above-described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

The present disclosure relates to the mounting system 204 for removably coupling the equipment 100 with the mounting structure 202. The mounting system 204 may allow quicker and reliable coupling of the equipment 100 with the mounting structure 202. The mounting system 204 is simple in design and includes cost-effective components. Further, the mounting system 204 may be used in applications where it is difficult to access all sides of the equipment 100 for coupling the equipment 100 with the mounting structure 202. Furthermore, the mounting system 204 allows the angular movement as well as the linear movement of the equipment 100 in different degrees of freedom during assembly, thereby compensating for any manufactural/dimensional variations.

The mounting system 204 includes the first and second flexible members 218, 236 that may effectively dampen vibrations, and thus the mounting system 204 may be employed in high vibration environments. Further, in an assembled condition, the mounting system 204 prevents any relative movement between the equipment 100 and the mounting structure 202, which may reduce wear, fatigue, and ultimately failures of the equipment 100 and/or the mounting structure 202. Thus, the mounting system 204 may reduce costs related with maintenance/replacement of the equipment 100 or the mounting structure 202.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A mounting system for an equipment, the mounting system being adapted to removably couple the equipment with a mounting structure, the mounting system comprising:
 a mounting bracket coupled to the mounting structure;
 a first flexible member disposed axially adjacent to the mounting bracket;
 a pin disposed axially adjacent to the first flexible member, wherein the first flexible member is disposed between the mounting bracket and the pin, wherein the pin includes a base and a body extending from the base along a first direction, and wherein the body includes a uniform section and a tapering section;
 a second flexible member disposed axially adjacent to the mounting bracket;
 a cover disposed axially adjacent to the second flexible member, wherein the second flexible member is disposed between the cover and the pin; and
 at least two mechanical fasteners that removably couple the mounting bracket with each of the first flexible member, the pin, the second flexible member, and the cover, wherein the at least two mechanical fasteners extend along a second direction that is opposite to the first direction.

2. The mounting system of claim 1, wherein the equipment defines an opening having a tapering cross-section, and wherein the tapering section is adapted to be received within the opening of the equipment to couple the pin with the equipment.

3. The mounting system of claim 1, wherein each of the first flexible member and the first flexible member is made of a rubber.

4. The mounting system of claim 1, wherein the mounting bracket includes a base plate and a pair of side plates extending along the second direction from the base plate to the cover.

5. The mounting system of claim 4, wherein the base plate of the mounting bracket defines a first central through-opening, wherein the first flexible member defines a second central through-opening, and wherein each of the first central through-opening of the mounting bracket and the second central through-opening of the first flexible member receive the uniform section of the body of the pin.

6. The mounting system of claim 1, wherein the mounting bracket is fixedly coupled to or integral with the at least two mechanical fasteners.

7. The mounting system of claim 1, wherein the pin is made of aluminum or steel.

8. The mounting system of claim 1 further comprising at least two retention nuts, wherein the at least two mechanical fasteners are removably coupled to a corresponding retention nut to retain the at least two mechanical fasteners in coupling with each of the mounting bracket, the first flexible member, the pin, the second flexible member, and the cover.

9. The mounting system of claim 1, wherein the equipment is an electric device or an electronic device.

10. The mounting system of claim 1, wherein the mounting bracket is fixedly coupled to or integral with the mounting structure.

11. A mounting assembly for an equipment, the mounting assembly comprising:
 a mounting structure adapted to be removably coupled with the equipment;
 a mounting system adapted to removably couple the equipment with the mounting structure, the mounting system including:
 a mounting bracket coupled to the mounting structure;
 a first flexible member disposed axially adjacent to the mounting bracket;
 a pin disposed axially adjacent to the first flexible member, wherein the first flexible member is disposed between the mounting bracket and the pin, wherein the pin includes a base and a body extending from the base along a first direction, and wherein the body includes a uniform section and a tapering section;
 a second flexible member disposed axially adjacent to the mounting bracket;
 a cover disposed axially adjacent to the second flexible member, wherein the second flexible member is disposed between the cover and the pin; and
 at least two mechanical fasteners that removably couple the mounting bracket with each of the first flexible member, the pin, the second flexible member, and the cover, wherein the at least two mechanical fasteners extend along a second direction that is opposite to the first direction.

12. The mounting assembly of claim 11, wherein the equipment defines an opening having a tapering cross-section, and wherein the tapering section is adapted to be received within the opening of the equipment to couple the pin with the equipment.

13. The mounting assembly of claim 11, wherein each of the first flexible member and the second flexible member is made of a rubber.

14. The mounting assembly of claim 11, wherein the mounting bracket includes a base plate and a pair of side plates extending along the second direction from the base plate to the cover.

15. The mounting assembly of claim 14, wherein the base plate of the mounting bracket defines a first central through-opening, wherein the first flexible member defines a second central through-opening, and wherein each of the first central through-opening of the mounting bracket and the second central through-opening of the first flexible member receive the uniform section of the body of the pin.

16. The mounting assembly of claim 11, wherein the mounting bracket is fixedly coupled to or integral with the at least two mechanical fasteners.

17. The mounting assembly of claim 11, wherein the pin is made of aluminum or steel.

18. The mounting assembly of claim 11, wherein the mounting system further includes at least two retention nuts, and wherein the at least two mechanical fasteners are removably coupled to a corresponding retention nut to retain the at least two mechanical fasteners in coupling with each of the mounting bracket, the first flexible member, the pin, the second flexible member, and the cover.

19. The mounting assembly of claim 11, wherein the equipment is an electric device or an electronic device.

20. The mounting assembly of claim 11, wherein the mounting bracket is fixedly coupled to or integral with the mounting structure.

* * * * *